GAS-FRACTIONATING COLUMN WITH A GAUZE FILTER

Filed Jan. 17, 1964

INVENTORS
JOHANNES VAN DER STER &
ALDERT T. BLOEM
BY
AGENT

United States Patent Office 3,264,832

Patented August 9, 1966

1

3,264,832
GAS-FRACTIONATING COLUMN WITH A GAUZE FILTER

Johannes van der Ster and Aldert Teunis Bloem, Emmasingel, Eindhoven, Netherlands, assignors to North American Philips Company, Inc., New York, N.Y., a corporation of Delaware Filed Jan. 17, 1964, Ser. No. 340,118
Claims priority, application Netherlands, Jan. 24, 1963, 288,162
6 Claims. (Cl. 62—14)

This invention relates to a gas-fractionating column for a gas, such as air, containing in addition to other constituents hydrocarbons and nitrous vapours, which column includes a first cooler for gas supplied to it. In addition, at least the lower part of the column is being surrounded by an annular duct containing members, such as gauze collars, ribs and the like. These members are in thermal contact with the wall of the annular duct and constitute, together with this wall a second cooler, said members being capable of separating out acetylene and other lightweight substances frozen out of the gas.

An object of the invention is to provide an improvement in the above-mentioned column and is based on recognition of the fact that for substantial removal of acetylene and other lightweight substances from the gas and the consequently required cooling of the gas, the gauze in the annular duct must not only have a large surface area but also be specially cooled.

In order to obtain a satisfactory separation of acetylene and other light-weight substances from the gas mixture supplied to the column, the gas fractionating column according to the invention is characterized in that it includes means which can specially cool at least that part of the wall of the annular duct with which the cooled members are connected. Said means are furthermore last passed by the gas to be fractionated.

This special cooling may be effected, for example, by fitting a container on the outer wall of the annular duct and passing through it a continuous flow of liquefied gas. If desired, part of the washing liquid from the column may then be used as the liquefied gas.

It is thus achieved that the gas mixture enters the column at a very low temperature at which substantially the whole quantity of acetylene has been frozen out of the gas mixture. The acetylene being frozen out is trapped by the gauze collars arranged in the annular duct.

In fractionating columns of the kind hereinbefore referred to, it is very important to remove acetylene from the gas mixture to be fractionated as completely as possible, since any acetylene left in the gas mixture finds its way in the lower part of the column into the liquid oxygen and is accumulated there and may cause explosions.

A favourable embodiment of a gas-fractionating column according to the invention in which the part of the column situated inside the annular duct is partly filled with packing, a distribution space for the washing liquid being provided above the said packing, is characterized in that the portion of the column wall surrounding the distribution space forms part of a liquid container in which washing liquid may be collected.

In known columns of this kind, the part of the column wall surrounding the distribution space, which thus contains no packing, is insufficiently contacted by the washing liquid so that the gauze collars connected with the said part of the column wall are insufficiently cooled. When use is made of the liquid container according to the invention, the part of the column wall surrounding the distribution space is specially brought into contact with the flushing liquid. This results in a higher temperature gradient in the second cooler being obtained, so that the gas mixture enters the column at a lower temperature and hence with a smaller content of acetylene.

2

Another favourable embodiment of the gas-fractionating column according to the invention is characterized in that the liquid container is constituted by an annular duct open at its upper end and extending along the part of the column wall surrounding the distribution space.

In order to prevent a rise in the temperature of the washing liquid resulting from volatilization of the fraction with the lower boiling point in the container, one advantageous embodiment of the column according to the invention is characterized in that the wall of the liquid container has near its bottom at least one bore through which part of the liquid collected in the container can leave the container.

The presence of a bore in the lower part of the container ensures a continuous flow through the container. Consequently, a uniform low temperature of the liquid in the container is guaranteed.

Another favourable embodiment of the column according to the invention is characterized in that the wall of the liquid container has near its bottom a plurality of bores divided over the whole circumference and together allowing a passage such that at least the whole quantity of washing liquid is distributed through these bores over the packing.

The rim of bores ensures a satisfactory distribution of the washing liquid over the packing of the column, so that further distribution means for the washing liquid can be dispensed with.

A favourable embodiment of the column according to the invention is further characterized in that the column includes a liquid container which is arranged inside the distribution space and is in thermal contact with the column wall surrounding the distribution space.

A favourable embodiment of the gas-fractionating column according to the invention is characterized in that the column includes a liquid container arranged in the upper part of the distribution space, which container is extended downwards in the form of a duct helically wound along the wall of the column.

To maintain the same low temperature of the liquid throughout the helical duct, another embodiment of the column according to the invention is characterized in that the lowest turn of the helix communicates through one or more further ducts with the liquid container.

In order that the invention may be readily carried into effect, it will now be described more fully, by way of example, with reference to the accompanying diagrammatic drawing, in which:

FIGURES 1 and 1*a* show diagrammatically and in cross-section respectively a gas-fractionating column including a liquid container situated along the part of the column wall surrounding the distribution space;

Figure 1A:
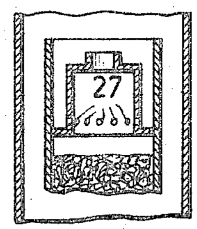
Figure 1:
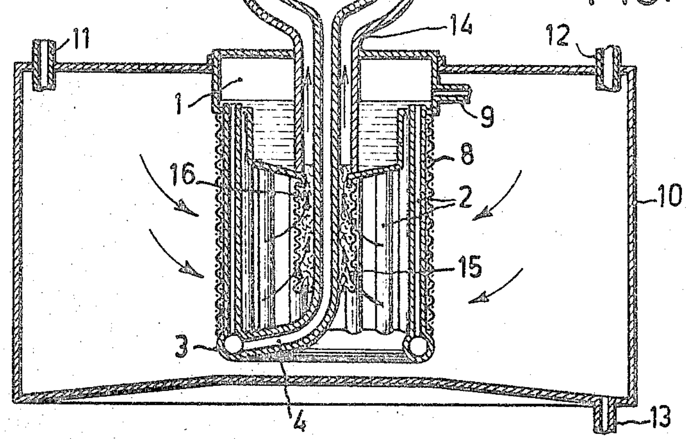

Referring now to FIGURE 1, the reference numeral 1 denotes a boiling vessel supporting a cage or frame of vertical pipes 2, the lower ends of which are connected to an annular duct 3 into which empties a tube 4 which supplies liquid gas from a fractionating column to the ring 3, the pipes 2 and the boiling vessel 1.

The column comprises a portion 5 and a portion 6, between which the inlet of the gas to be fractionated is situated at 7. The portions 5 and 6 are filled with a packing of Raschig rings, saddle-shaped pieces of gauze or the like.

The cage of pipes 2 is surrounded by a cylinder 8 of metal gauze. The gauze may be soldered to the pipes and is strongly cooled by the liquefied gas flowing through the pipes 2.

The boiling vessel 1 has an outlet 9 for gas. The vessel 1 is situated in a housing 10 to which gas to be fractionated is supplied through openings 11 and 12. Water separated from this gas is collected on the bottom of the housing 10 and removed through a line 13. The water which does not collect at the bottom of the housing 10 is deposited on the metal gauze 8 in the form of a growing layer of snow.

The tube 4 and the portion 5 of the column is surrounded by a tube 14. This tube 14 extends through the boiling vessel 1 and its lower end is secured to an apertured pot 15 containing filtering material 16. An annular duct 17 is provided between the tube 14 and the portion 5 of the column and contains gauze collars 18 which are in thermal contact with the outer wall of the column portion 5.

Liquefied gas is led back as reflux into the column through a pipe 19. The liquid in the column is distributed over the packing by distributors 20 and 21.

A portion 22 of the wall of column portion 5, which surrounds the distributor 21, is internally provided with an annular liquid container 23 in which washing liquid flowing out of the column portion 6 is collected and brought into thermal contact with the wall portion 22.

The assembly shown is in practice surrounded by insulation to prevent loss of cold. By means of the duct 19, the upper end of the column can be connected to the head of a cold-gas refrigerator which then serves as source of cold for the gas-fractionating column. The gas to be fractionated need then not be supplied to the column at a pressure considerably exceeding the atmospheric pressure.

The column operates as follows.

Gas to be fractionated is introduced into the housing 10 through the openings 11 and 12. Water is partly separated by condensation and is collected on the bottom of the housing 10. On its way to the column, the gas first meets the strongly cooled gauze 8 on which a snow cake is formed consisting of crystals of water and carbon dioxide. Remarkably this cake remains pervious to the gas for a long time. The gas is strongly cooled in the snow cake formed on the gauze 8 and the pipes 2 and flows through the filter 15, 16 upwards into the annular space 17 between the tube 14 and the outer wall of portion 5 of the column. The annular space 17 contains the gauze collars 18. These gauze collars 18 are in thermal contact with the wall of the column portion 5 and hence cooled. When the gas passes through the gauze collars and the snow-cake depositing thereon, it is thus cooled further to so low a temperature that acetylene starts freezing out which is deposited as a snow cake on the gauze collars 18. In order that the acetylene is frozen out as completely as possible, it is necessary for the gas, before entering the column at 7, to be cooled as far as possible. To this end the gauze collars 18, which are passed last by the gas to be fractionated, must be specially cooled. The lower gauze collars are cooled due to the wall with which these collars are in thermal contact with the packing through which the cold washing liquid flows downwards. The upper wall portion 22, however, which surrounds the distributor 21, does not contact with the packing. In order to cool this wall portion 22, a liquid container 23 is arranged inside in which the washing liquid flowing out of the portion 6 of the column is collected. Thus a satisfactory contact is obtained between the washing liquid and the wall 22 so that the gauze collars connected to this wall portion are specially cooled. Consequently, the gas to be fractionated enters the column at a very low temperature and is substantially free of acetylene.

To prevent the liquid in the container 23 from becoming warmer due to volatilization of the fraction having the lower boiling point, a bore 27 is provided in the wall of the container. Part of the liquid can flow through said bore out of the container so that a continuous flow through the container is obtained. The liquid thus has the same low temperature throughout the container.

The part of the washing liquid which is not removed through the bore 27 flows over the upper edge of the container 23 and is distributed over the packing by the distributor 21.

A structure which no longer requires the liquid distributor 21 is shown in FIGURE 1*a*. The wall of the liquid container 23 is in this case provided throughout its periphery with a plurality of bores 27. The whole quantity of substantially the whole quantity of washing liquid collected in the container 23 is now distributed over the packing through the bores 27.

Figure 2:
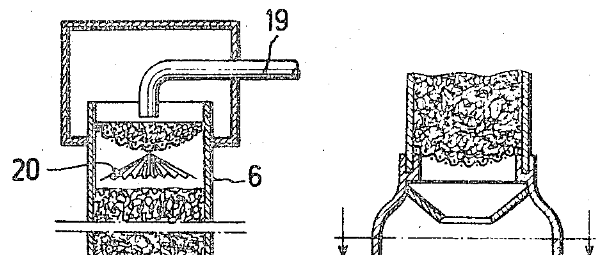
FIGURE 2 shows a portion of the gas-fractionating column of FIGURE 1, which column includes a liquid container provided with a helical duct extending along the wall of the column.
Figure 2:
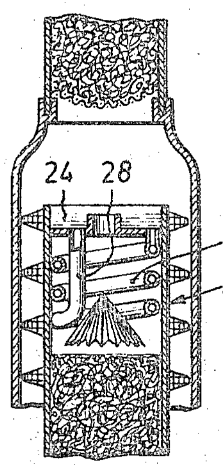

Another possibility of specially cooling the wall portion 22 is shown in FIGURE 2. Now inside this wall portion there is provided a shallow liquid container 24 the lower side of which is connected with a helically wound line 25 which is in thermal contact with the wall portion 22. In order to prevent also in this case an increase of the temperature in the line 25, the lowest turn of the helix is connected to the container 24 through one or more further lines 28. Consequently, the liquid can circulate in the lines so that a uniform strong cooling of the wall portion 22 is guaranteed.

Figure 3:
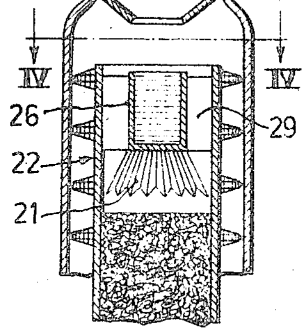
FIGURES 3 and 4 are a partial axial section and a partial cross-section view of the column respectively, with FIG. 4 being taken on the line IV—IV of FIG. 3, this column including a liquid container which is in thermal contact with the wall of the column.
Figure 4:
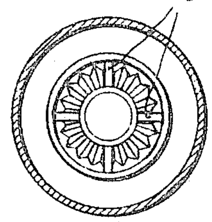

A further possibility of cooling the wall portion 22 is shown in FIGURES 3 and 4. In this case, a liquid container 26 is centrally arranged inside the wall portion 22. The liquid container 26 is connected through ribs 29 made of material of high thermal conductivity to the wall 22 which is thus in satisfactory thermal contact with the washing liquid in the container 26. This structure has the additional advantage that the distributor 21 can be integral with the lower side of the container 26. To permit satisfactory distribution of the liquid over the packing, it is also possible to omit the distributor 21 and provide the ribs 29 with projecting pins which distribute the liquid flowing out of the container 26 over the packing.

It has been found that even at high initial concentrations of acetylene in the gas to be fractionated, the gauze 8 and the gauze collars 18 and the snow cakes deposited thereon, when cooled in the manner according to the invention, collect so much acetylene that dangerous concentrations of acetylene do not occur in the boiling vessel.

What has been said above for acetylene, also applies to other hydrocarbons and nitrous vapours.

What is claimed is:

1. A gas fractionating apparatus for a gas mixture including hydrocarbons and nitrous vapors comprising a fractionating column separated into an upper and lower part, a first cooler for said gas mixture, a second cooler including an annular duct surrounding at least the lower part of said column, a plurality of spaced gauze members in said annular duct having said gas mixture passing therethrough, a cooling liquid container within the lower part of said column wall for supplying cold through the adjacent column wall to at least one of the gauze members last contacted by said gas mixture before entry into said fractionating column, said liquid container being provided with at least one opening through which part of said liquid collected in said container can leave the same and enter said column, said gauze member last contacted by said gas mixture before entry into the fractionating column being capable of freezing out acetylene and other lightweight substances.

2. A gas fractionating column for a gas mixture including hydrocarbons and nitrous vapors comprising a first cooler for said gas mixture, a second cooler including an annular duct surrounding at least the lower part of said column, a plurality of spaced gauze members in said annular duct having said gas mixture passing therethrough, a cooling liquid container for supplying cold to at least one of gauze members last contacted by said gas mixture before entry into said fractionating column, the latter gauze member being capable of freezing out acetylene and other lightweight substances, a plurality of packing in at least a portion of said fractionating column, a distribution space for the cooling liquid in said column being located above said packing, and a part of said column wall surrounding said distribution space forming part of said liquid container in which said cooling liquid can be collected.

3. A gas fractionating column as claimed in claim 2 wherein said liquid container is provided adjacent to the bottom thereof with a plurality of spaced openings whereby substantially the whole quantity of washing liquid is distributed over the packing in said column.

4. A gas fractionating column for a gas mixture including hydrocarbons and nitrous vapors comprising a first cooler for said gas mixture, a second cooler including an annular duct surrounding at least the lower part of said column, a plurality of spaced gauze members in said annular duct having said gas mixture passing therethrough, a distribution space in said column, a cooling liquid container arranged in said distribution space and having ribs thereon in thremal contact with the portion of the wall of said column surrounding said distribution space, said liquid contanier supplying cold to at least one of gauze members last contacted by said gas mixture before entry into said fractionating column, the latter gauze member being capable of freezing out acetylene and other lightweight substances.

5. A gas fractionating column for a gas mixture including hydrocarbons and nitrous vapors comprising a first cooler for said gas mixture, a second cooler including an annular duct surrounding at least the lower part of said column, a plurality of spaced gauze members in said annular duct having said gas mixture passing therethrough, a distribution space in said column, a cooling liquid container arranged in the upper part of said distribution space and in the form of a helix extending downwardly and in engagement with a portion of the inner wall of said column, said liquid container supplying cold to at least one of gauze members last contacted by said gas mixture before entry into said fractionating column, the gauze member being capable of freezing out acetylene and other lightweight substances.

6. A gas fractionating column as claimed in claim 5, further comprising at least one duct wherein the lowest turn of said helix is connected to said liquid container through said one duct.

References Cited by the Examiner

UNITED STATES PATENTS

| | | | |
|---|---|---|---|
| 841,153 | 1/1907 | Just | 55—387 X |
| 2,165,490 | 7/1939 | Kranz | 261—154 X |
| 2,895,303 | 7/1959 | Streeter. | |
| 2,915,883 | 12/1959 | Van der Ster | 62—13 X |
| 2,918,801 | 12/1959 | First | 62—14 |
| 3,124,443 | 3/1964 | Hellingman | 62—14 X |
| 3,129,082 | 4/1964 | Roozendaal | 62—14 |

NORMAN YUDKOFF, *Primary Examiner.*

V. W. PRETKA, J. C. JOHNSON, *Assistant Examiners.*